Dec. 10, 1968 W. C. WIERS 3,416,071
ELECTRONIC TUNER FOR INDUCTIVE PROBE TESTING APPARATUS
Filed April 19, 1965 2 Sheets-Sheet 1

INVENTOR
WILLIAM C. WIERS
BY Olsen and Stephenson
ATTORNEYS

INVENTOR
WILLIAM C. WIERS
BY Olsen and Stephenson
ATTORNEYS

United States Patent Office 3,416,071
Patented Dec. 10, 1968

3,416,071
ELECTRONIC TUNER FOR INDUCTIVE PROBE TESTING APPARATUS
William C. Wiers, Ann Arbor, Mich., assignor to Automation-Forster, Inc., a corporation of Michigan
Filed Apr. 19, 1965, Ser. No. 448,925
6 Claims. (Cl. 324—40)

This invention relates generally to a tuner which multiplies the susceptance of a basic impedance and more particularly to a testing apparatus having an inductive probe which is tuned electronically by multiplying the susceptance of the probe when the probe is loaded by a specimen.

A co-pending U.S. patent application, Serial No. 449,055, now Patent No. 3,314,006, entitled "Probe Circuit for Material Testing Instrument," filed concurrently with the present application in the name of Rudolph G. Hentschel and assigned to the assignee of the present application, discloses an eddy current testing apparatus wherein the impedance of a probe tank circuit is compared to the impedance of a reference tank circuit to obtain a difference signal representing differences in characteristics between a test specimen and a standard. In general a drive signal is applied to the reference tank circuit and to the probe tank circuit. An inductive probe coil coupled into the probe tank circuit is adapted to receive a specimen under test. The drive signal may be varied in frequency, from below one hundred cycles per second to several hundred kilocycles, depending on the type of test and the particular material being tested. In order to use a constant drive level with a single probe at different frequencies, and thus achieve a constant sensitivity at different frequencies, components in the tank circuits are changed at each test frequency so that the tuned circuits are resonant at the test frequency selected and the resonant impedance of the tank circuits is a constant impedance at all frequencies in the absence of a test specimen in the probe. When a standard specimen is inserted into the probe to establish a reference for comparison with other test specimens, it is necessary to retune the probe tuned circuit to resonance and manually adjust the resonant impedance of the reference tank circuit to again balance the tank circuits so that the reference tank circuit will provide a standard impedance when test specimens are inserted into the probe.

This invention contemplates, as one of its objects, a multi-frequency testing apparatus of the aforementioned general type wherein an inductive probe coupled in a tank circuit is tuned electronically to eliminate limitations inherent in manually variable impedances.

Another object of the present invention is to provide a circuit element the basic impedance value of which can be tuned electronically in a simple and effective manner without limitations inherent in manually variable impedance devices.

Further objects, features and advantages of the present invention will become apparent from a consideration of the following description, the appended claims, and the accompanying drawings in which:

Figure 1:
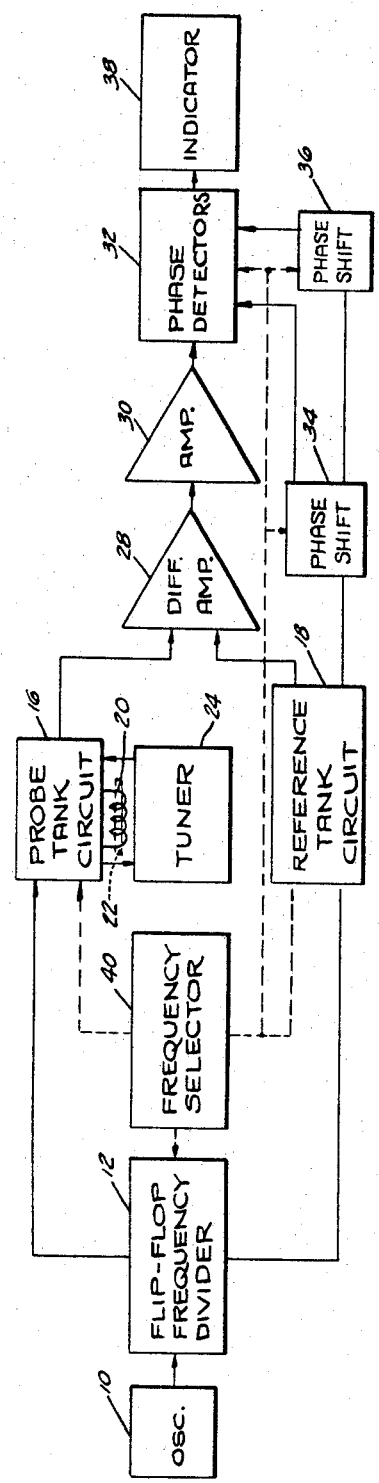
FIGURE 1 is a block diagram of a multi-frequency testing apparatus constructed in accordance with the present invention wherein impedance changes in a tank circuit are compared to the impedance of a reference tank circuit and the apparent impedance in the probe tank circuit due to the probe is tuned electronically when a standard specimen is inserted into the probe.

Referring to FIG. 1, an eddy current testing apparatus is illustrated as generally comprising a stable frequency oscillator 10 whose output is connected to a frequency divider 12 to provide a source of square wave drive signals which are applied to a probe tank circuit 16 and to a reference tank circuit 18. Oscillator 10 is a crystal controlled oscillator to provide an alternating current signal at a very precise frequency. Frequency divider 12 includes a series or chain of conventional flip-flop or binary circuits which provide the square wave output. Suitable clipping and shaping circuits (not shown) may be included at the output from frequency divider 12 so that drive signals to tank circuits 16, 18 are precise square waves.

Coupled into the probe tank circuit 16 is a fixed inductance probe coil 20 adapted to receive a specimen, such as a standard specimen 22. With specimen 22 removed from probe 20, tank circuits 16, 18 are tuned to parallel resonance at the frequency of the drive signal from frequency divider 12 and have the same resonant impedance. In accordance with one aspect of the present invention, an electronic tuner 24 is coupled in the probe tank circuit 16 to match the phase between the tank circuits when the standard specimen 22 is inserted in probe 20. With the tank circuit 16 returned, the $Q$s (the ratio of inductive reactance to resistance in tank circuits 16, 18) of tank circuits 16, 18 are matched by adjusting components in tank circuit 18. Tank circuits 16, 18 have sinusoidal outputs which are applied to and compared by a difference amplifier 28 to provide a difference signal. Before the standard specimen 22 is inserted into coil 20, or after the tank circuit 16 has been retuned by tuner 24 with the standard specimen in coil 20, the output from the difference amplifier 28 is zero. However when a second specimen is inserted into coil 20, the output from difference amplifier 28 will represent variations in the characteristics of the specimens. The difference signal from amplifier 28 is amplified by an amplifier 30 which has broad band characterstics and a variable gain to control the sensitivity of the test apparatus. The amplified difference signal from amplifier 30 is connected to a pair of phase detectors 32 which are controlled by a pair of quadrature control signals derived from tank circuit 18 through a pair of phase shift circuits 34, 36. Phase shift circuit 36 introduces a 90 phase difference between the two control signals whereas phase shift circuit 34 varies the phase of both control signals relative to the phase of the reference output from tank circuit 18. The output from phase detectors 32 is a pair of unidirectional voltages representing quadrature components of the difference signal from amplifier 30 as explained more fully in the aforementioned Hentschel patent application and a U.S. Letters Patent No. 2,806,992, entitled "Measuring and Testing Instruments," granted Sept. 15, 1957 in the name of Friedrich Foerster. The output from phase detectors 32 may be displayed on suitable indicator 38 such as an oscilloscope. A frequency selector 40 is mechanically connected to frequency divider 12, tank circuits 16, 18, phase shift circuits 34, 36 and phase detectors 32 to change the drive frequency and components in the tank circuits 16, 18, phase detectors 32 and phase shift circuits 34, 36 for operation at the frequency selected by an operator.

When a particular test frequency is selected by means of frequency selector 40, components in the probe tank circuit 16 and in reference tank circuit 18 are automatically switched for parallel reasonance at the test frequency selected. Because the tank circuits 16, 18 are operated at or near resonance the square wave output drive 14 appears as sinusoidal signals in the tank circuits and the tank circuits present a constant predetermined resonant impedance to the drive. When a standard specimen 22 is inserted into coil 20 tank circuit 16 is then retuned by means of tuner 24 and the resonant impedance in tank circuit 18 is again adjusted to balance the tank circuits so that the output difference amplifier is zero. When the standard specimen 22 is removed from coil 20 and a second test specimen is inserted into the coil, any differences in the characteristics of the specimen from the standard specimen 22 will provide a difference signal from amplifier 28 having phase and amplitude variations that will be detected and displayed on indicator 38.

Tank circuit 16 generally comprises an iron core winding 50 having three spaced taps 51, 52, 53 with tap 51 being grounded at a terminal 54. Coil 20 is connected in series with a resistor 55 directly across taps 51, 52. Tuner 24 is also connected across taps 51, 52 and has an input from resistor 55 which is proportional to the current through coil 20. Tank circuit 16 also comprises a pair of capacitors 56, 58. Capacitor 56 and the portion of winding 50 between taps 51, 52 together with resistor 55 and coil 20 (air loaded) are chosen to resonate at a selected test frequency whereas capacitor 58 and the inductance of winding 50 between taps 51, 53 together with resistor 55 and coil 20 (air loaded) are chosen to resonate at a selected lower frequency. A double-pole double-throw switch 60 has a common terminal 61 and a switch arm 62 which is electrically connected to terminal 61. With arm 62 in its upper position as shown in full lines in FIG. 2, capacitor 58 is paralleled across taps 51, 53 with capacitor 58 and winding 50 together with resistor 55 and coil 20 connected in series with the terminals 54, 61. With arm 62 in a lower position shown in dash lines, capacitor 56 is paralleled with winding 50 between taps 51, 52. A variable resistor 64 is connected between terminal 61 and an input terminal 66. The square wave output from frequency divider 12 is applied to terminal 66 and ground (terminal 54). An output terminal 68 is also connected to terminal 61 for applying the output from tank circuit 16 to amplifier 28 (FIG. 1).

Tank circuit 18 is substantially similar to tank circuit 16 except for the omission of a probe coil. An inductor 70 has three taps 71, 72, 73 arranged to be selectively connected in parallel with respective capacitors 76, 78 by means of a switch 80. Switch 80 has a common terminal 91 and a switch arm 92 for connecting capacitor 78 across taps 71, 73 when arm 92 is in its raised position as viewed in FIG. 2, and for connecting capacitor 76 across taps 71, 72 when the arm is in its lowered position. Terminal 91 is connected directly to input terminal 66 through a variable resistor 94 and also directly to an output terminal 98. Connected between terminal 91 and ground is a variable resistor 99. Switches 60, 80 are ganged together by a mechanical linkage shown by a dash line and designated by numeral 100. Linkage 100 is connected to the frequency selector 40 (FIG. 1) and is manually controlled by the operator.

Capacitors 56, 58, 76, 78 and the inductance between the corresponding taps on winding 50 and inductor 70 are chosen such that the input impedance for each tank circuit 16, 18 is balanced at a predetermined constant impedance at all test frequencies when coil 20 is air loaded and tuner 24 is set properly. With coil 20 and tuner 24 connected to winding 50, the inductance between taps 51, 52 equals the inductance between taps 71, 72 on inductor 70 and the inductance between taps 51, 53 equals the inductance between taps 71, 73. The inductance of coil 20 (air loaded) and tuner 24 apparent to tank circuit 16 is equal to the inductance of winding 50 between taps 51, 52 for maximum power transfer. The drive level of tank circuits 16, 18 can be varied slightly by changing resistors 64, 94. The $Q$s of tank circuits 16, 18 can be balanced by varying resistor 99. The effects of adjusting the resistor 99 may be determined by observing the characteristics of the indications produced by the indicator 38. By using the autotransformer coupling of coil 20 into tank circuit 16 a single probe can be used over a wide frequency range by merely selecting the proper tap on winding 50 and the proper parallel capacitor for each test frequency. Although tank circuits 16, 18 have been described for only two test frequencies it will be understood that any number of test frequencies can be used by merely connecting additional capacitors and additional taps on windings 50, 70 and by modifying switches 60, 80.

Referring to tuner 24 (FIG. 3) the input from resistor 55 (FIGS. 2 and 3) is applied to a two-stage variable-gain amplifier 102 and then through a current amplifier 104 to a high output impedance amplifier 106. Amplifier 106 has output terminals 108, 110 connected across taps 51, 52 of winding 50 (in shunt with coil 20 and resistor 55) through a pair of coupling capacitors 112, 114 and serves as a current source effectively in shunt with coil 20 across taps 51, 52. Resistor 55 has a small resistance, in the order of several ohms, to sense current through coil 20 and develop a control signal which is coupled to a paralleled resistor 116 and capacitor 118 and then through a coupling capacitor 120 to the emitter of a grounded base PNP transistor 122 in amplifier 102. Transistor 122 is emitter biased by a voltage divider comprising series resistors 124, 126 and a Zener diode 128 connected between a positive supply terminal 122 and ground 54. Transistor 122 has its collector output direct-current biased through a load resistor 130 and a resistor 132 connected to a negative supply terminal 134. Capacitor 114 is connected at one end between resistors 130, 132 and to ground 54 at its other end. Resistor 130 develops an alternating current output which is applied to the emitter of a PNP transistor 134A through a coupling capacitor 136 and a potentiometer 138. Potentiometer 138 serves as a current divider to control the gain of amplifier 102. The effects of adjusting the potentiometer 138 may be determined by observing the indications produced by the indicator 38. Potentiometer 138 is preferably connected directly between the emitter of transistor 134 and ground 54 through a shielded lead so that the potentiometer can be physically positioned for manual control by an operator. Transistor 134 has its base biased by a divider comprising series resistors 140, 142, a Zener diode 144 and resistor 132. Resistors 132, 140 are small value decoupling resistors used to set the direct current supply level. A bypass capacitor 146 is connected across diode 144 between the base of transistor 134 and capacitor 114. Transistor 134 has a collector output circuit including a load resistor 148 and resistor 132. The output developed across resistor 148 is coupled directly to the base input of an emitter follower NPN transistor 150 through a resistor 152. Transistor 150 has its emitter biased through an output resistor 154 and resistor 132. The collector of transistor 150 is connected to the positive supply terminal 122 through resistor 140. The emitter follower output developed across resistor 154 is applied to the base of an NPN transistor 156 in amplifier 106. Transistor 156 is direct-coupled to the base of a complementary PNP transistor 158 with the emitter of transistor 156 and the collector of transistor 158 being connected to the terminal 110 through an output resistor 160. The emitter of transistor 158 is connected directly to terminal 108 which in turn is connected to the positive supply terminal 122 by a choke coil 162 and resistor 140. The alternating current impedance of choke coil 162 is high to block drive signal frequencies.

In general the tuner 24 described in connection with

Figure 3:
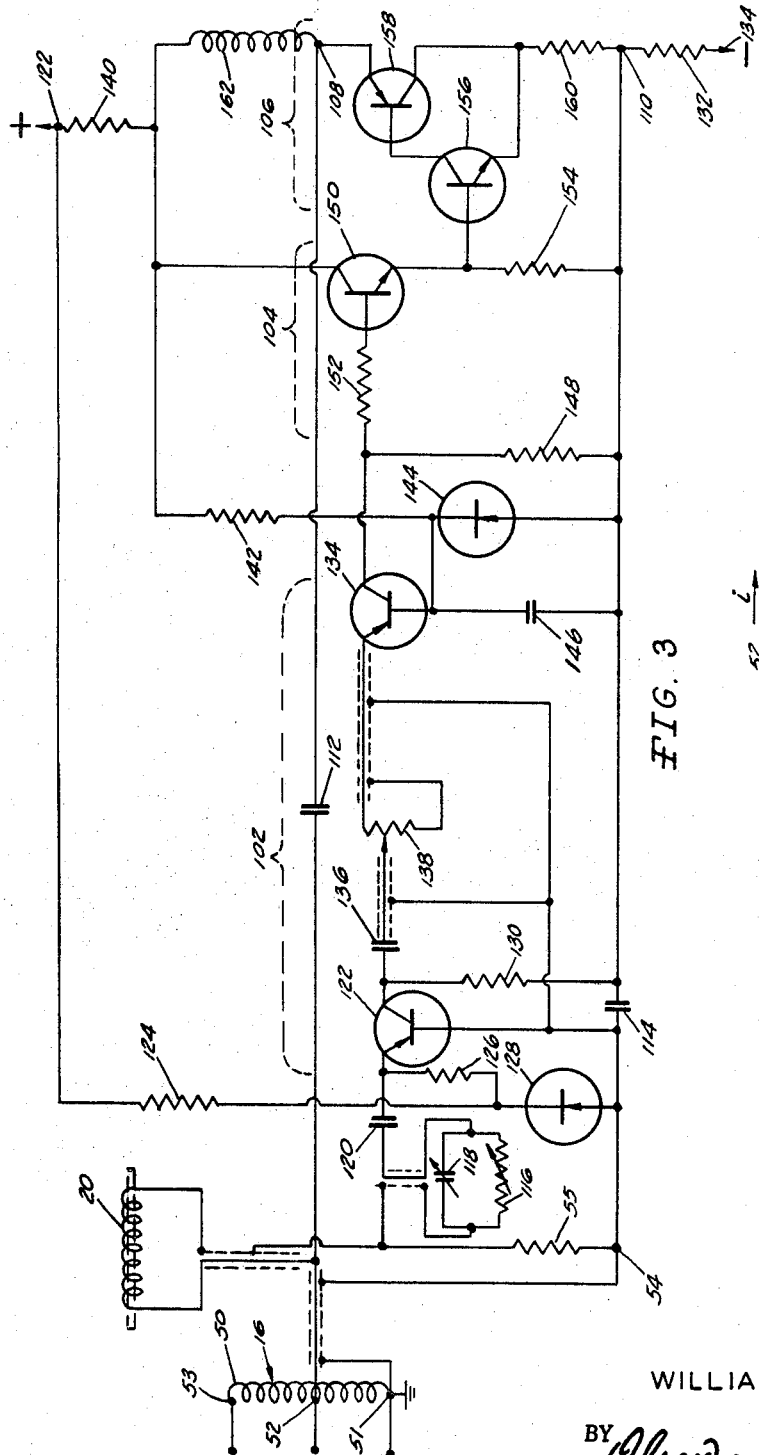
FIGURE 3 is a circuit diagram of the tuner which multiplies the susceptance of the probe to retune the impedance of the probe apparent to the tank circuit when a standard specimen is inserted into the probe.

FIG. 3 is a current input device that in effect multiplies the susceptance of probe coil 20 as seen across terminals 51, 52 by a factor dependent on the gain of amplifier 102 by drawing current through the transistor 158 of the same nature as the current through coil 20. By varying the gain of amplifier 102 the basic impedance of coil 20 can be multiplied to retune tank circuit 16 after the standard specimen 22 has been inserted into coil 20. Stated differently, the output current of amplifier 106 is substantially in phase with the current through probe 20 but multiplied in amplitude by a factor dependent on the gain of amplifier 102. Amplifiers 104, 106 are used to boost the variable gain of amplifier 102 and thus increase the total current gain in tuner 24. The connection of transistors 156, 158 yields a large current gain with the value of the output current of the tuner being set by the ratio of resistors 148, 160. The gain of amplifier 102 is varied by manually adjusting potentiometer 138. Resistor 116 and capacitor 118 assure that the current output of amplifier 102 always leads the current input slightly to prevent oscillation build-up in tank circuit 16. Resistor 116 and capacitor 118 are varied by the operator depending on the frequency of the drive signal.

Figure 2:
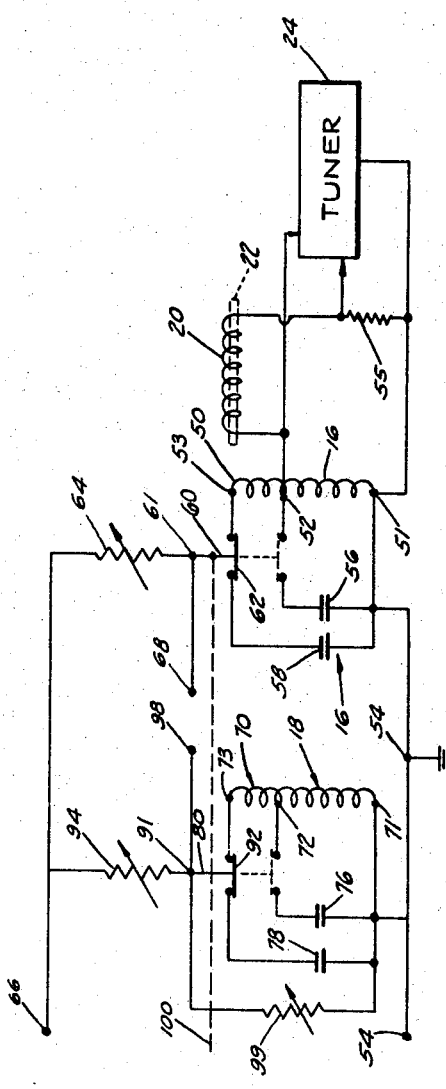
FIGURE 2 is a circuit diagram of the probe tank circuit and the reference tank circuit to illustrate connections in the tank circuits for use at different frequencies and connections of the probe and tuner in the probe tank circuit.
Figure 4:
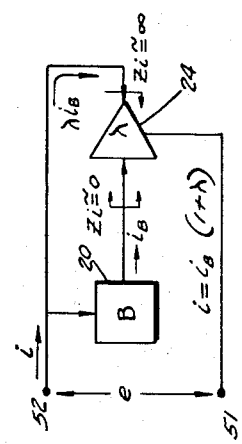
FIGURE 4 is a schematic block diagram for use in explaining the operation of the tuner.

Referring to FIG. 4 a branch B which corresponds to the probe branch (FIGS. 2 and 3), is illustrated connected across terminals 51, 52 (FIGS. 2 and 3). In the absence of tuner 24 the total current $i$ from terminals 51, 52 is equal to the current $i_B$ through the branch B. However tuner 24 will draw an additional current $\lambda i_B$ from terminals 51, 52 where $\lambda$ is the total gain of amplifiers 102, 104, 106 (FIG. 3). Thus the result of adding tuner 24 is that the total current $i$ through terminals 51, 52 appears as the same nature as the current $i_B$ in branch B but with the basic parameters increased by a factor $(1+\lambda)$. In particular if for the branch B without tuner 24 or with $\lambda$ equal to zero:

$$C_B = \text{capacitance of Branch B} = \frac{i_B}{de/dt}$$

$$G_B = \text{conductance of Branch B} = \frac{i_B}{e}$$

$$\Gamma_B = \text{inductive susceptance of Branch B} = \frac{i_B}{\int e\,dt}$$

When tuner 24 is added in parallel to the branch B, the new total current $i$ through terminals 51, 52 is $i_B + \lambda i_B$ for the resulting parallel branches and the parameters of coil 20 apparent at terminals 51, 52 are:

$$C_A = \text{apparent capacitance} = (1+\lambda)\frac{i_B}{de/dt} = (1+\lambda)C_B$$

$$G_A = \text{apparent conductance} = (1+\lambda)\frac{i_B}{e} = (1+\lambda)G_B$$

$$\Gamma_A = \text{apparent inductive susceptance} =$$

$$(1+\lambda)\frac{i_B}{\int e\,dt} = (1+\lambda)\Gamma_B$$

Thus the effect of tuner 24 is to multiply the susceptance (resistive, inductive, or capacitive) of coil 20 by a factor of $(1+\lambda)$. By making the gain of tuner 24 variable, the basic parameters of coil 20 or of any inductor or capacitor can be varied. Thus the apparent impedance of coil 20 can be changed by varying a resistive potentiometer. Variable capacitors and inductors which have inherent limitations can thus be eliminated.

Tuner 24 illustrated in FIG. 3 is a current input amplifier with current output that is a function $\lambda$ of the input current through coil 20. The output impedance at the collector of transistor 158 is sufficiently high to satisfy the high impedance requirement and feedback could be used to extend the output impedance if necessary. By way of example transistor 158 may have an output impedance in the order of from 500K to 2 meg. The output at terminals 108, 110 should approach a true current source with the current through terminals 108, 110 being independent of the voltage across terminals 108, 110. The input impedance of transistor 122 together with resistors 55, 166 is sufficiently low so that current through coil 20 can be sensed without affecting the current through the coil.

When an operator selects a particular drive frequency desired by means of frequency selector 40 (FIG. 1) switches 60, 80 are actuated simultaneously to tune tank circuits 16, 18 to resonance at the frequency selected. Regardless of the frequency selected the input impedance of each of the tank circuits 16, 18 will remain constant so that for a given drive level the sensitivity of the apparatus remains constant at all frequencies. The drive level can be adjusted slightly by varying resistors 64, 94. With the tank circuits 16, 18 balanced and the output from difference amplifier 28 equal to zero, when the standard specimen 22 is inserted into coil 20, the inductance of coil 20 increases and the current through the probe drops proportionally. The operator then adjusts potentiometer 138 so that tuner 24 draws additional inductive current, substantially in phase with the current in coil 20, to bring the inductance of coil 20 apparent to terminals 51, 52 back to the level existing prior to insertion of the specimen. The effectiveness of this adjustment may be observed on the indicator 38. The impedance of coil 20 apparent to terminals 51, 52 is substantially equal to the impedance of winding 50 between terminals 51, 52 for maximum power transfer. Since tuner 24 also multiplies the resistance component due to loading, resistor 99 is then varied to match the Q of tank circuit 18 to the Q of tank circuit 16. The effectiveness of this adjustment may be observed on the indicator 38.

With coil 20 tuned electronically back to the original impedance level by multiplying the susceptance of the coil, variations in the specimens produce the same percentage variation in the apparent coil (coil and tuner) as in the actual coil. The impedance of coil 20 apparent to tuned circuit 16 is within a range that permits effective indications without substantial changes in sensitivity or wide variations in the drive level to tanks 16, 18. Moreover the apparent change in the inductance of coil 20 is achieved by merely varying the resistance of potentiometer 138 in tuner 24. By way of example tuner 24 has been used with a 10 millihenry (open air) coil to retune from loaded values between 9–100 millihenries.

With tank circuits 16, 18 again balanced, the output from difference amplifier 28 (FIG. 1) will be zero and tank circuits 16, 18 will be set to provide a standard impedance for comparison with additional test specimens. When standard specimen 22 is removed from coil 20 and a second test specimen is inserted into the coil, any difference in the characteristics of the two specimens will change the phase and amplitude of the output from tank circuit 16 relative to the output from tank circuit 18. The outputs from terminals 68, 98 are compared by the difference amplifier 28 to provide a difference signal representing any differences in characteristics between the two specimens. Quadrature components of the difference signal are detected by detectors 32 and displayed on indicator 38.

It will be understood that the electronic tuner for inductive probe testing apparatus herein described and disclosed is presented for purposes of explanation and illustration and is not intended to indicate limits of the invention, the scope of which is defined in the following claims.

What is claimed is:

1. In a multi-frequency apparatus for use in eddy current testing a source of drive signals having a first frequency selected within a range of test frequencies, means for changing the frequency of said drive signals to a second frequency within said range, a fixed inductance probe arranged and adapted to be excited by said drive signals and loaded by a specimen, said probe having an output representing the impedance of the said probe, means providing a standard impedance output for comparison with said probe output when said probe is loaded by said specimen, variable transformer means coupled to said probe for maintaining a substantially constant impedance of said probe and said transformer means at said first and said second frequencies in the absence of a specimen, tuner means coupled to said probe for varying an inductance of said probe apparent to said transformer when said probe is loaded by a standard specimen to adjust the phase of said probe output relative to said standard impedance output, means for comparing said standard impedance output with said probe output to provide a difference signal when said probe is loaded by a test specimen, and means responsive to said difference signal for indicating characteristics of said specimen.

2. The device set forth in claim 1 wherein said transformer means comprises a coil having first and second taps, said probe being connected in a first branch circuit across said first and second taps, current sensing means coupled in said first branch to provide a control signal proportional to current in said first branch, a current source connected in a second branch across said first and second terminals, and means responsive to said control signal for controlling said current source to maintain current in said second branch proportional in phase to current in said first branch.

3. A probe circuit for use in eddy current testing comprising a pair of input terminals, means for applying a drive signal to said terminals, a fixed impedance probe, resistance means connected in series with said probe across said terminals, and a current source connected across said terminals in parallel with said series connected probe and resistor, said current source comprising a first current amplifier having an output and an input, a variable gain current amplifier having an input and an output, said input of said variable gain amplifier being connected across said resistance means, said output of said variable gain amplifier being connected to said input of said first amplifier, said input of said variable gain amplifier together with said resistance means presenting a low impedance relative to said probe impedance and said output of said first amplifier presenting a high impedance relative to said probe impedance.

4. In a multi-frequency instrument for use in eddy current testing a source of stable frequency sinusoidal signals, conversion means responsive to said signals for providing a square wave drive signal, means for selectively varying said drive signals between a first frequency and a second frequency, and a probe input circuit operatively connected to said conversion means to be energized by said drive signals and arranged and adapted to provide an output signal representing a difference in characteristics between a test specimen and a standard comprising a first tuned circuit having a capacitive reactance leg, an inductive reactance leg and a resistive leg, a second tuned circuit having a capacitive reactance leg and an inductive reactance leg, said inductive reactance leg of said second tuned circuit comprising an autotransformer coil having first, second and third taps, resistance means, a fixed inductance probe connected in series with said resistance means across said first and second taps, current source means connected across said first and second taps and responsive to current in said resistance means to provide a second current proportional to current in said probe, said current source means including a variable gain current amplifier, and switch means operatively connected in said probe circuit to selectively connect said first and second terminals in said inductive leg of said second tuned circuit at said first frequency and said first and third terminals in said inductive leg of said second tuned circuit at said second frequency.

5. A multi-frequency test apparatus for testing a workpiece, said apparatus including the combination of;
a signal source effective to provide a test signal having a frequency within a predetermined range of test frequencies,
a probe having an apparent impedance, said probe being interconnected with said source and excited by said test signal to provide an output signal, said probe being adapted to be coupled to the workpiece whereby variations in the impedance of the probe correspond to a characteristic of the workpiece and the output signal is a function of said characteristic,
means coupled to said probe for multiplying the susceptance of the probe whereby the impedance thereof remains substantially constant at each test frequency,
means providing a reference signal corresponding to a particular characteristic of the workpiece,
means coupled to the probe and to the reference means for comprising the reference and output signal and producing a difference signal representing a characteristic of the workpiece, and
means responsive to said difference signal for indicating said characteristic of said workpiece.

6. A multi-frequency test apparatus for testing a workpiece, said apparatus including the combination of;
a multi-frequency signal source effective to provide a test signal,
means coupled to said source to vary the frequency of said signal within a predetermined range of test frequencies,
a pickup probe interconnected with said source and excited by said test signal to provide an output signal, said probe being adapted to be coupled to said workpiece whereby the impedance of the probe is a function of a characteristic of the workpiece and said output signal represents said characteristic of the workpiece,
control means coupled to the signal source and to the pickup probe, said control means being effective to change the test frequency and to change the impedance of the probe in accordance with the test frequency,
means providing a reference signal corresponding to a particular characteristic of the workpiece,
means interconnected with the probe and the reference means for comparing said reference signal with the test signal and producing a difference signal representing the characteristic of the workpiece,
means coupled to the pickup probe and effective to multiply the susceptance of the probe to maintain the apparent impedance thereof substantially constant at each test frequency whereby the sensitivity of the test apparatus is substantially constant at all test frequencies, and
means responsive to said difference signal for indicating said characteristic of said workpiece.

References Cited
UNITED STATES PATENTS
2,216,829  10/1940  Plebanski _____ 334—14

OTHER REFERENCES

Kiver, M. S.: Transistors in Radio and Television, McGraw-Hill Book Company, New York 1956, p. 122, TK 7872 T73K5, pp. 108, 123.

Ryder, J. D.: Electronic Fundamentals and Applications, Prentice-Hall, Inc., Englewood Cliffs, N.J., 1959, TK7815 Re, p. 337.

RUDOLPH V. ROLINEC, *Primary Examiner.*

R. J. CORCORAN, *Assistant Examiner.*